(12) United States Patent
Kaushik et al.

(10) Patent No.: US 10,809,936 B1
(45) Date of Patent: Oct. 20, 2020

(54) UTILIZING MACHINE LEARNING TO DETECT EVENTS IMPACTING PERFORMANCE OF WORKLOADS RUNNING ON STORAGE SYSTEMS

(71) Applicant: EMC IP Holding Company LLC, Hopkinton, MA (US)

(72) Inventors: Vibhor Kaushik, Shrewsbury, MA (US); Zachary W. Arnold, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/526,265

(22) Filed: Jul. 30, 2019

(51) Int. Cl.
*G06F 3/06* (2006.01)
*G06F 11/34* (2006.01)
*G06N 20/00* (2019.01)
*G06N 3/04* (2006.01)
*G06F 17/15* (2006.01)
(Continued)

(52) U.S. Cl.
CPC ............ *G06F 3/0647* (2013.01); *G06F 3/067* (2013.01); *G06F 3/0617* (2013.01); *G06F 11/3485* (2013.01); *G06F 17/15* (2013.01); *G06K 9/6267* (2013.01); *G06N 3/04* (2013.01); *G06N 5/04* (2013.01); *G06N 20/00* (2019.01)

(58) Field of Classification Search
CPC .................................................... G06F 3/0647
USPC ....................................................... 711/154
See application file for complete search history.

(56) References Cited

U.S. PATENT DOCUMENTS

| 4,954,951 A | * | 9/1990 | Hyatt | ................... | G05B 19/351 |
| | | | | | 711/218 |
| 2015/0242325 A1 | * | 8/2015 | Caulkins | ............. | G06F 12/0871 |
| | | | | | 711/105 |

(Continued)

FOREIGN PATENT DOCUMENTS

WO     2017040001 A1     3/2017

OTHER PUBLICATIONS

U.S. Appl. No. 16/390,534, filed Apr. 22, 2019 in the name of Arnold et al. and entitled "Identifying Performance Impact Events in Data Storage Equipment Based on Queue Depth Metrics.".

*Primary Examiner* — Jae U Yu
(74) *Attorney, Agent, or Firm* — Ryan, Mason & Lewis, LLP

(57) ABSTRACT

A method includes monitoring a given workload running on one or more storage systems to obtain performance data, detecting a given potential performance-impacting event affecting the given workload based at least in part on a given portion of the obtained performance data, and generating a visualization of at least the given portion of the obtained performance data. The method also includes providing the generated visualization as input to a machine learning algorithm, utilizing the machine learning algorithm to classify the given potential performance-impacting event as one of (i) a true positive event affecting performance of the given workload and (ii) a false positive event corresponding to one or more changes in storage resource utilization by the given workload, and modifying provisioning of storage resources of the one or more storage systems responsive to classifying the given potential performance-impacting event as a true positive event affecting performance of the given workload.

20 Claims, 7 Drawing Sheets

(51) Int. Cl.
    *G06K 9/62*     (2006.01)
    *G06N 5/04*     (2006.01)

(56) References Cited

U.S. PATENT DOCUMENTS

2016/0063359 A1    3/2016    Szegedy et al.
2016/0196672 A1    7/2016    Chertok et al.

* cited by examiner

UTILIZING MACHINE LEARNING TO DETECT EVENTS IMPACTING PERFORMANCE OF WORKLOADS RUNNING ON STORAGE SYSTEMS

FIELD

The field relates generally to information processing systems, and more particularly to storage in information processing systems.

BACKGROUND

Information processing systems may provision storage resources of various storage systems for use by different users. The different users, for example, may have associated storage pools each comprising storage resources provisioned from one or more storage systems. Each storage system may therefore run multiple different workloads. The different workloads may be associated with a same user, or different users. Each of the workloads may have its own unique demand or storage profile, and the various workloads running on a given storage system share various resources of the given storage system.

SUMMARY

Illustrative embodiments provide techniques for utilizing machine learning to detect events impacting performance of workloads running on storage systems. Embodiments advantageously enable efficient allocation and provisioning of storage resources.

In one embodiment, a method comprises monitoring a given workload running on one or more storage systems to obtain performance data associated with the given workload, detecting a given potential performance-impacting event affecting the given workload based at least in part on a given portion of the obtained performance data, and generating a visualization of at least the given portion of the obtained performance data. The method also comprises providing the generated visualization as input to a machine learning algorithm, utilizing the machine learning algorithm to classify the given potential performance-impacting event as one of (i) a true positive event affecting performance of the given workload and (ii) a false positive event corresponding to one or more changes in storage resource utilization by the given workload, and modifying provisioning of storage resources of the one or more storage systems responsive to classifying the given potential performance-impacting event as a true positive event affecting performance of the given workload. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
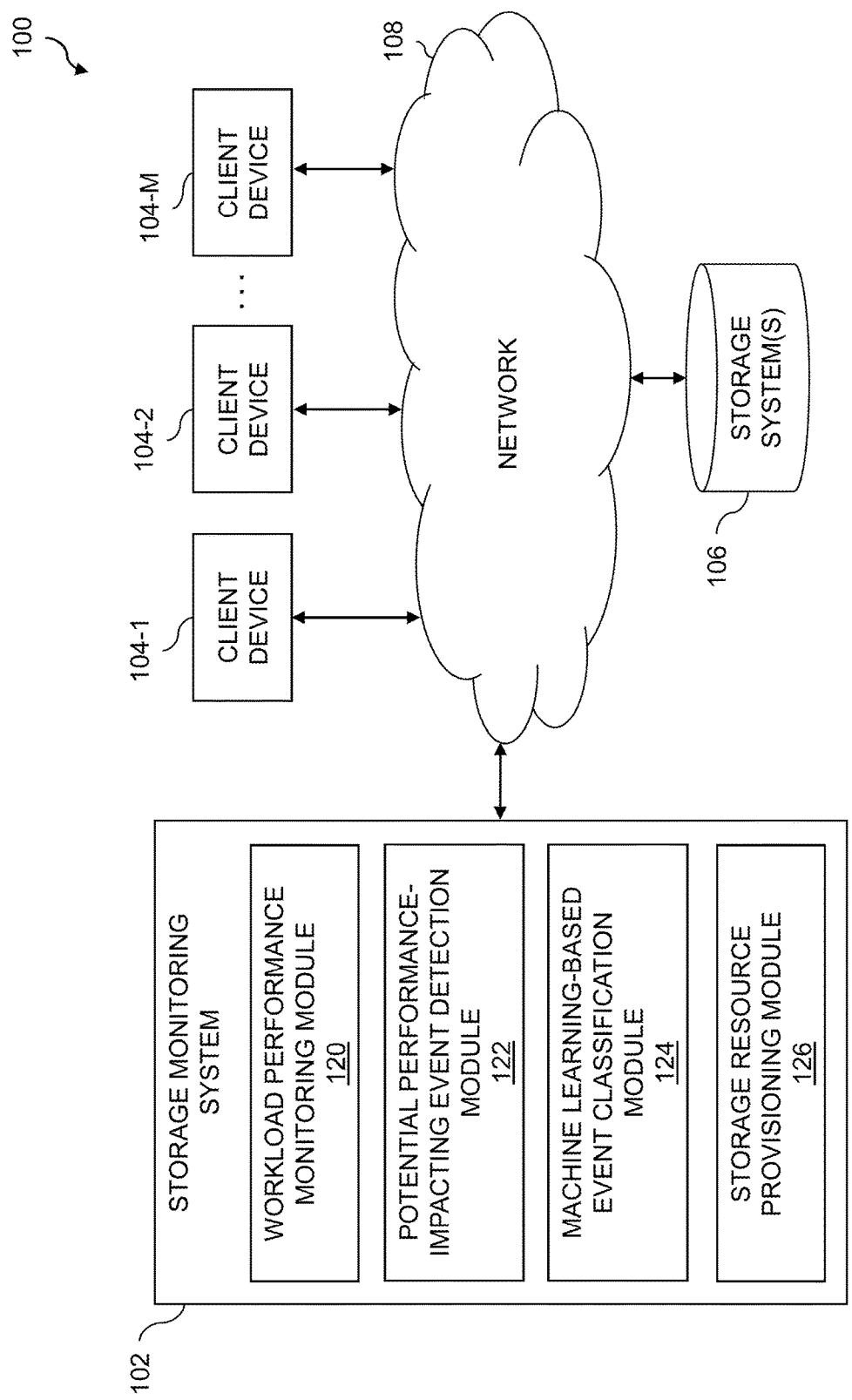
FIG. 1 is a block diagram of an information processing system for classifying potential performance-impacting events affecting workloads running on one or more storage systems in an illustrative embodiment.

FIG. 1 shows an information processing system 100 configured in accordance with an illustrative embodiment. The information processing system 100 is assumed to be built on at least one processing platform and provides a storage monitoring system 102 configured to classify potential performance-impacting events affecting workloads running on one or more storage systems 106 using a machine learning algorithm or neural network.

The storage systems 106 may comprise one or multiple different storage systems which collectively provide a set of storage resources that may be provisioned for use by users of a set of client devices 104-1, 104-2, . . . 104-M (collectively, client devices 104). For example, users of the client devices 104 may schedule workloads to run on the storage systems 106. The client devices 104 are examples of "host" devices that provide input/output (IO) requests to the storage systems 106. Although shown as separate in FIG. 1, in some embodiments at least a portion of the storage systems 106 may be part of the storage monitoring system 102.

The storage systems 106 provide storage resources or capacity that may be allocated or provisioned for use by data consumers or other users via the client devices 104. The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

In some embodiments, the storage systems 106 comprise a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage monitoring system 102, client devices 104 and storage systems 106 may be connected via at least one network 108. The network 108 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the storage resource capacity modeling framework 102, as well as to support communication between the enterprise storage resource capacity modeling framework 102 and other related systems and devices not explicitly shown.

The storage monitoring system 102 in the FIG. 1 embodiment implements a number of functional modules for classifying potential performance-impacting events affecting workloads running on the storage systems 106. Such functional modules include a workload performance monitoring module 120, a potential performance-impacting event detection module 122, a machine learning-based event classification module 124 and a storage resource provisioning module 126.

The workload performance monitoring module 120 is configured to monitor workloads running on the storage systems 106 to obtain performance data associated with the workloads. The potential performance-impacting event detection module 122 is configured to detect potential performance-impacting events affecting the workloads based at least in part on the obtained performance data. The storage monitoring system 102 is further configured to generate visualizations of the obtained performance data (e.g., graphs or plots of performance metrics in the obtained performance data for one or more of the workloads). The machine-learning based event classification module 124 is configured to provide the generated visualizations as input to a machine learning algorithm, and to utilize the machine learning algorithm to classify the potential performance-impacting events as one of (i) a true positive event affecting performance of a given workload and (ii) a false positive event corresponding to one or more changes in storage resource utilization by a given workload. The storage resource provisioning module 126 is configured to modify provisioning of storage resources of the one or more storage systems responsive to classifying a given potential performance-impacting event as (i) a true positive event affecting performance of a given workload.

It is to be appreciated that the particular arrangement of the storage monitoring system 102, client devices 104 and storage systems 106 illustrated in the FIG. 1 embodiment is presented by way of example only, and alternative arrangements can be used in other embodiments. As an example, the functionality associated with the workload performance monitoring module 120, the potential performance-impacting event detection module 122, the machine learning-based event classification module 124 and the storage resource provisioning module 126 may in some embodiments be combined into fewer modules, or may be separated across more modules, with the multiple modules possibly being implemented with multiple distinct processors or processing devices. As another example, one or more of the storage systems 106 may be implemented at least in part within the storage monitoring system 102. The storage monitoring system 102 may also be implemented at least partially internal to one or more of the client devices 104.

At least portions of the workload performance monitoring module 120, the potential performance-impacting event detection module 122, the machine learning-based event classification module 124 and the storage resource provisioning module 126 may be implemented at least in part in the form of software that is stored in memory and executed by a processor.

In some embodiments, the storage monitoring system 102 generates alerts and notifications that are provided over network 108 to client devices 104, or to a system administrator, information technology (IT) manager, or other authorized personnel via one or more host agents. Such host agents may be implemented via computing or processing devices associated with a system administrator, IT manager or other authorized personnel. Such devices can illustratively comprise mobile telephones, laptop computers, tablet computers, desktop computers, or other types of computers or processing devices configured for communication over network 108 with the storage monitoring system 102. For example, a given host agent may comprise a mobile telephone equipped with a mobile application configured to receive alerts from the storage monitoring system 102. The alert or notification provide to a host agent may highlight particular details of a detected performance-impacting event, such as via a graphical user interface (GUI). The host agent may also provide interface features for selecting particular remedial measures for responding to the alert or notification. Examples of such remedial measures may include altering or modifying the provisioning of storage resources for a particular user, workload or storage system. Modifying provisioning may include allocating additional storage resources to or removing storage resources from a particular user, workload or storage system. Modifying provisioning may also or alternatively include migrating data or a workload between different storage resources or storage systems in response to an alert or notification (e.g., from a first set of storage systems to a second set of storage systems, where the first and second sets of storage systems may have different performance characteristics, capacity, etc.). Modifying provisioning may also or alternatively include throttling a particular workload, adjusting policies, rules or parameters of a particular workload, etc.

It should be noted that a "host agent" as this term is generally used herein may comprise an automated entity, such as a software entity running on a processing device. Accordingly, a host agent need not be a human entity.

It is to be understood that the particular set of elements shown in FIG. 1 for classifying potential performance-impacting events affecting workloads running on one or more storage systems is presented by way of illustrative example only, and in other embodiments additional or alternative elements may be used. Thus, another embodiment may include additional or alternative systems, devices and other network entities, as well as different arrangements of modules and other components.

The storage monitoring system 102 and other portions of the system 100, as will be described in further detail below, may be part of cloud infrastructure such as an Amazon Web Services (AWS) system. Other examples of cloud-based systems that can be used to provide the monitoring system 102 include Virtustream Enterprise Clotid Virtustream Storage Cloud, Google Cloud Platform (GCP) and Microsoft Azure.

The storage monitoring system 102 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The storage monitoring system 102 or components thereof (e.g., the workload performance monitoring module 120, the potential performance-impacting event detection module 122, the machine learning-based event classification module 124 and the storage resource provisioning module 126) may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage monitoring system 102 and storage systems 106 or portions or components thereof, to reside in different data centers. Numerous other distributed implementations are possible. The storage monitoring system 102 can also be implemented in a distributed manner across multiple data centers.

Additional examples of processing platforms utilized to implement the storage monitoring system 102 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for classifying potential performance-impacting events affecting workloads running on one or more storage systems will now be described in more detail with reference to the flow diagram of FIG. 2. It is to be understood that this particular process is only an example, and that additional or alternative processes for classifying potential performance-impacting events affecting workloads running on one or more storage systems can be carried out in other embodiments.

In this embodiment, the process includes steps 200 through 210. These steps are assumed to be performed by the storage monitoring system 102 utilizing the workload performance monitoring module 120, the potential performance-impacting event detection module 122, the machine learning-based event classification module 124 and the storage resource provisioning module 126. The process begins with step 200, monitoring a given workload running on one or more storage systems to obtain performance data associated with the given workload. In step 202, a given potential performance-impacting event affecting the given workload is detected based at least in part on a given portion of the obtained performance data. The performance data may comprise a plurality of performance metrics for the given workload over a designated time range, where the plurality of performance metrics may include one or more throughput metrics, one or more latency metrics, one or more queue depth metrics, read percentage metrics, etc. In some embodiments, the one or more queue depth metrics are derived at least in part from the one or more throughput metrics and the one or more latency metrics. Detecting a given potential performance-impacting event affecting the given workload in step 202 may comprise detecting at least one of covariance between two or more of a plurality of performance metrics in a time series of the performance data, correlations between two or more of the plurality of performance metrics in the performance data, violation of one or more designated threshold conditions associated with one or more of the plurality of performance metrics in the performance data, etc.

Figure 2:
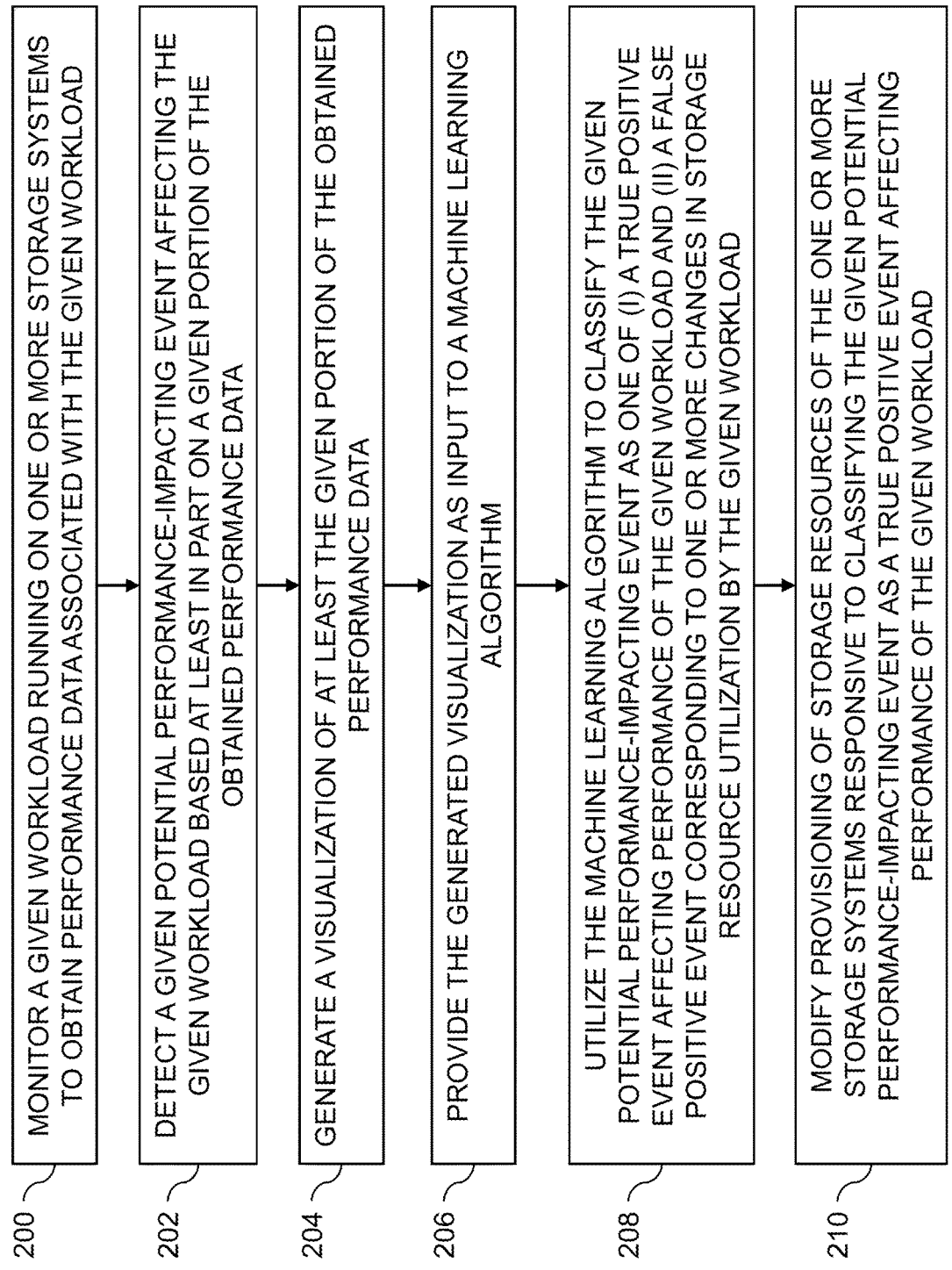
FIG. 2 is a flow diagram of an exemplary process for classifying potential performance-impacting events affecting workloads running on one or more storage systems in an illustrative embodiment.

The FIG. 2 process continues with generating a visualization of at least the given portion of the obtained performance data in step 204, and providing the generated visualization as input to a machine learning algorithm in step 206. In step 208, the machine learning algorithm is utilized to classify the given potential performance-impacting event as one of (i) a true positive event affecting performance of the given workload and (ii) a false positive event corresponding to one or more changes in storage resource utilization by the given workload. The FIG. 2 process concludes with step 210, modifying provisioning of storage resources of the one or more storage systems responsive to classifying the given potential performance-impacting event as a true positive event affecting performance of the given workload. Step 210 may include allocating additional storage resources to the given workload, migrating the given workload from a first set of storage resources to a second set of storage resources having different performance characteristics, etc.

The machine learning algorithm may comprise a neural network architecture, such as a Convolutional Neural Network (CNN). The CNN may comprise an input layer configured to receive as input an image file comprising the generated visualization, at least one hidden layer configured to detect features in the generated visualization corresponding to true positive performance impacting events affecting performance of the given workload and false positive events corresponding to one or more changes in storage resource utilization by the given workload, and an output layer configured to utilize the detected features to classify the given potential performance-impacting event as one of (i) a true positive event affecting performance of the given workload and (ii) a false positive event corresponding to one or more changes in storage resource utilization by the given workload. The at least one hidden layer may utilize one or more Rectified Linear Unit (RELU) activation functions. The output layer may comprise a softmax output layer.

The FIG. 2 process may further include, responsive to classifying the given potential performance-impacting event as a false positive event corresponding to one or more changes in storage resource utilization by the given workload, generating and providing an alert to a user associated with the given workload indicating that a change in performance of the given workload is a result of the one or more changes in storage resource utilization by the given workload. A recommendation may be generated for one or more changes to storage resources allocated to the given workload responsive to the one or more changes in storage resource utilization by the given workload (e.g., increasing storage resources allocated to the given workload, migrating the given workload from a first set of storage resources to a second set of storage resources with different performance characteristics, etc.).

As described above, storage systems may strive to balance the demands of various different workloads, where each workload may have its own unique storage resource utilization profile. The different workloads running on a particular storage system share the storage resources of the storage system. It is difficult to identify and troubleshoot issues related to degradation of workload performance as a result of contention on the underlying storage system or systems providing the storage resources for a given workload.

Storage systems may include storage processors, storage devices, front-end and back-end adapters, communication busses, etc. The storage processors receive and process 10 requests from hosts (e.g., client devices 104) that write data to and read data from the storage devices of the storage systems. Storage systems may be monitored during operation to display various performance characteristics. The output may be in the form of graphs plotting changes in one or more performance characteristics over time, or other visualizations of the monitored performance characteristics. The performance characteristics may include, by way of example, IOP S, latency over time, read percentage, etc. While a human operator can view the displayed output to try to detect trends corresponding to performance-impacting events, it is difficult to train a human operator to spot, diagnose and correct such issues. Further, some performance-impacting events may be difficult to discern via simple viewing of the displayed output.

Instead of relying on a human operator viewing a display of certain operating and performance characteristics of a workload or storage system, more advanced techniques may be used for automated detection of performance-impacting events. In some embodiments, for example, performance-impacting events may be detected utilizing queue depth metrics. Advantageously, queue depth metrics may be computed from other performance data that is normally or routinely collected by monitoring tools to detect a time range wherein a possible performance-impacting event may have occurred. The performance data for that time range may then be further analyzed to identify whether an actual performance-impacting event has occurred. Such analysis may include detecting covariance in time series data, correlations between data, whether certain thresholds have been met, etc. If an actual performance-impacting event is detected, various remedial actions may be initiated to mitigate the performance-impacting event.

As noted above, various types of performance data may be collected or monitored over time. Such performance data may include IOPS or other throughput information, latency information, percentage of read (or write) operations, etc. The performance data may be collected periodically, such as every minute, five minutes, hour, etc. The performance data may be individualized or specific to a particular user, workload, storage system, or storage object (e.g., a logical unit (LUN), filesystem, redundant array of independent disks (RAID) group, combinations thereof, etc.).

Figure 3:
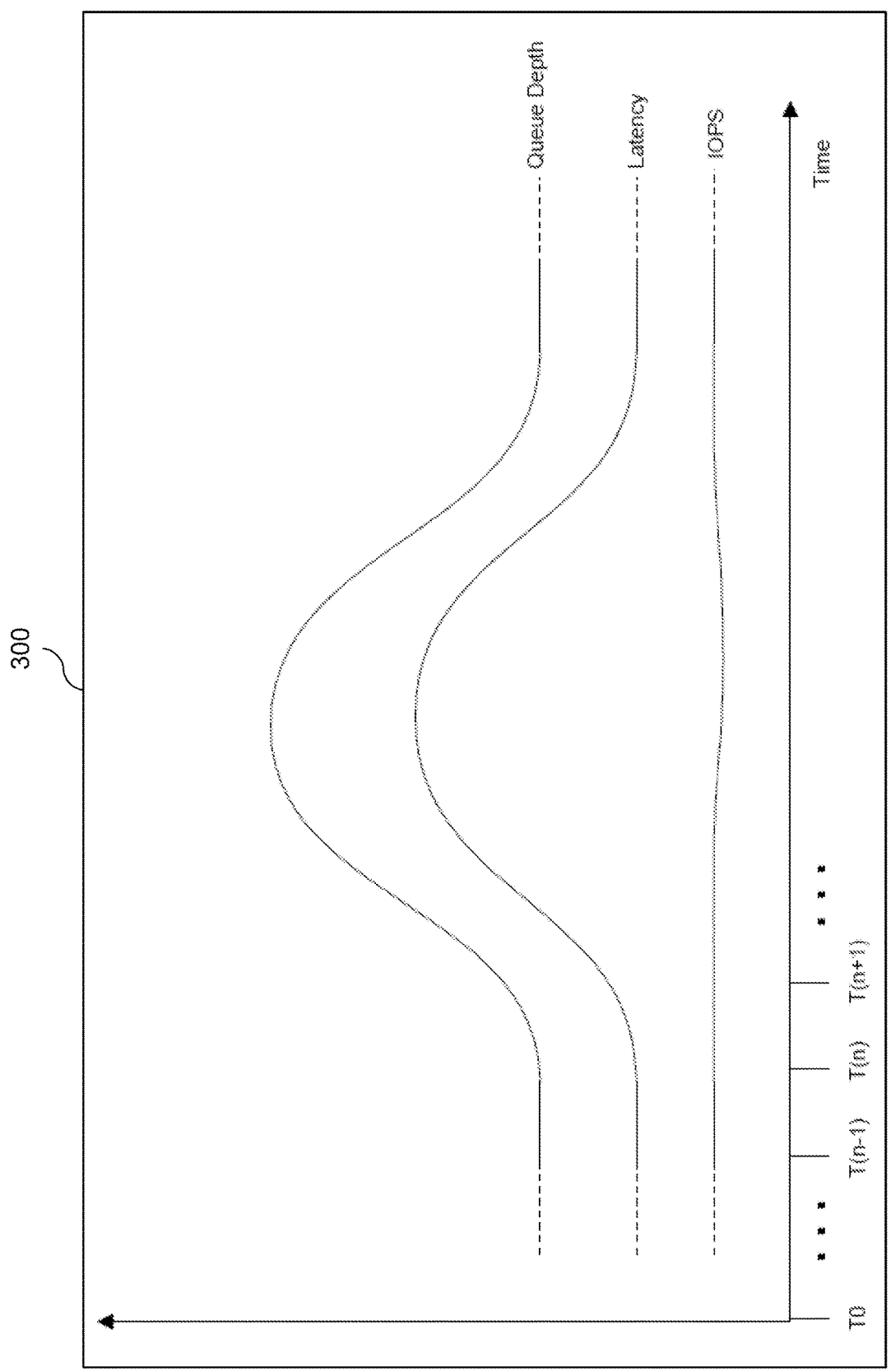
FIG. 3 shows an example plot of workload performance characteristics in an illustrative embodiment.
Figure 4:
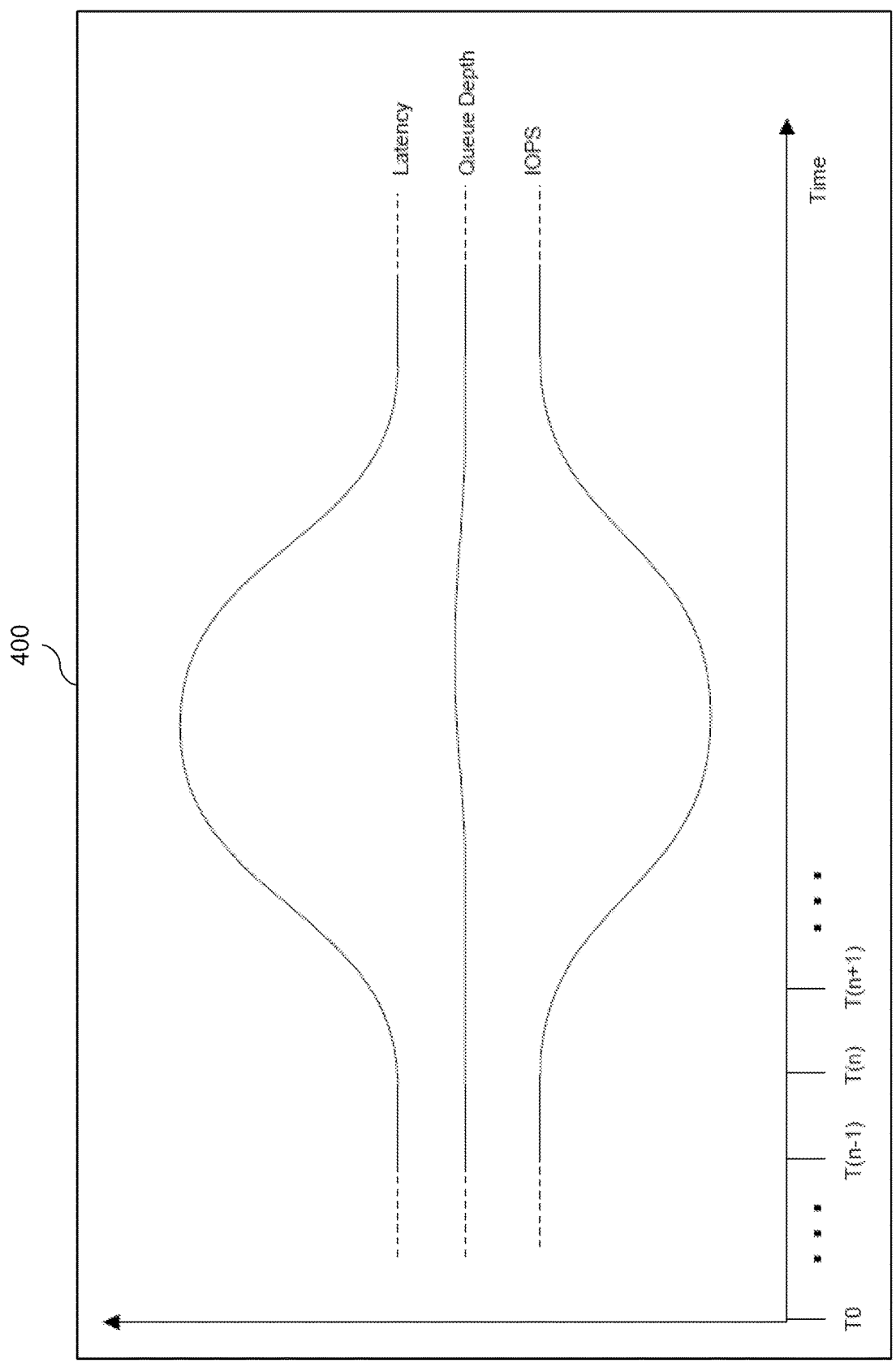
FIG. 4 shows another example plot of workload performance characteristics in an illustrative embodiment.

FIGS. 3 and 4 illustrate graphs 300 and 400, respectively, of performance data collected for different types of workloads. The graph 300 in FIG. 3 illustrates performance characteristics of latency, IOPS and queue depth for an online transaction processing (OLTP) workload. The graph 400 in FIG. 4 illustrates performance characteristics of IOPS, latency and queue depth for an online analytical processing (OLAP) workload. The queue depth may be derived from IOPS and latency using Little's Law (e.g., queue depth is equal to IOPS times latency). The queue depth metric may be provided directly from a monitoring tool, or may be derived from IOPS and latency information provided by the monitoring tool. As illustrated in FIG. 3, for the OLTP workload the throughput (e.g., IOPS) is relatively constant. Since the throughput is relatively constant, the queue depth tends to mirror latency in the OLTP workload. In comparison, the OLAP workload illustrated in FIG. 4 has relatively stable queue depth but varying throughput (e.g., IOPS). Variations in throughput are thus typically accompanied by an opposite variation in latency for the OLAP workload.

To detect performance-impacting events, the performance data such as that shown in FIGS. 3 and 4 may be analyzed. For example, the queue depth for a given time range may be compared to an average queue depth for a particular workload to determine whether the queue depth in the given time range varies from the average queue depth by more than a specified threshold (e.g., 50%, 100%, etc.). The average queue depth is assumed to be calculated over a greater time range (e.g., twelve hours, a day, a week, etc.) than the given time range (e.g., fifteen minutes, a half-hour, an hour, etc.). A potential performance-impacting event may be detected when the queue depth for at least a portion of the given time range exceeds the average queue depth by more than the specified threshold.

Various other techniques for analyzing performance data may be used to detect potential performance-impacting events, including but not limited to: determining whether there is a negative covariance between latency and IOPS over a given time range; determining whether average IOPS over a given time range is less than average IOPS overall (e.g., over a longer time range or evaluation period); determining whether there is a correlation between read percentage (e.g., the percentage of IO operations performed on a storage system that are read operations) and latency over a given time range; determining whether there is an inverse correlation between read percentage and latency over a given time range; determining whether there is a correlation between latency and IO size over a given time range; etc. It should be appreciated that the above examples of techniques for analyzing workload performance data to detect potential performance-impacting events are presented by way of example only, and that various other types of parameters, thresholds, etc. may be used to detect certain desired types of performance-impacting events.

The above-described techniques for identifying potential performance-impacting events associated with a workload or storage system may flag instances where performance degrades due to changes in a workload (e.g., a workload starts to use storage resources in a different way) that are not true performance-impacting events (e.g., which may correspond to failure of a storage system or components thereof, running out of storage resources, etc.). There is a need for systems that can accurately identify when a performance-impacting event associated with the given workload is a "true positive" performance-impacting event versus a "false positive" performance-impacting event corresponding to a workload change.

Some embodiments utilize one or more of the above-described techniques to identify potential performance-impacting events. In the description below, it is assumed that the potential performance-impacting events are detected using an algorithm that is based on Little's Law and time series correlation for detecting certain patterns in the performance characteristics of one or more storage systems providing storage resources for a given workload (e.g., where IOPS is correlated with an increase in latency indicating that the storage system does not have enough storage resources to satisfy the given workload). It should be appreciated, however, that various other patterns in performance characteristics may be used to detect potential performance-impacting events as described above, including combinations of multiple techniques described above.

While such algorithms are useful for detecting potential performance-impacting events, the algorithms may lead to significant amounts of false positive events (e.g., 50% or more false positive events). As described above, a "false positive" event is a potential performance-impacting event that is the result of changes in the storage resource utilization of a given workload, as compared with a "true positive" performance-impacting event that affects workload performance.

To distinguish between true positive performance-impacting events and the false positives, some embodiments utilize machine learning algorithms. Workload or storage system performance data of potential performance-impacting events may be input to a neural network trained (e.g., using data for potential performance-impacting events labeled as true positives and false positives) to classify the performance data as either a true positive or false positive performance-impacting event. In some embodiments, the input to the neural network is in the form of "images" (e.g., JPEG or other image files) depicting graphs or plots of the performance characteristics of a workload or one or more storage systems over a time range in which a potential performance-impacting event has been detected. The neural network provides as output a classification result, indicating whether the potential performance-impacting event is a true positive or false positive.

Figure 5:
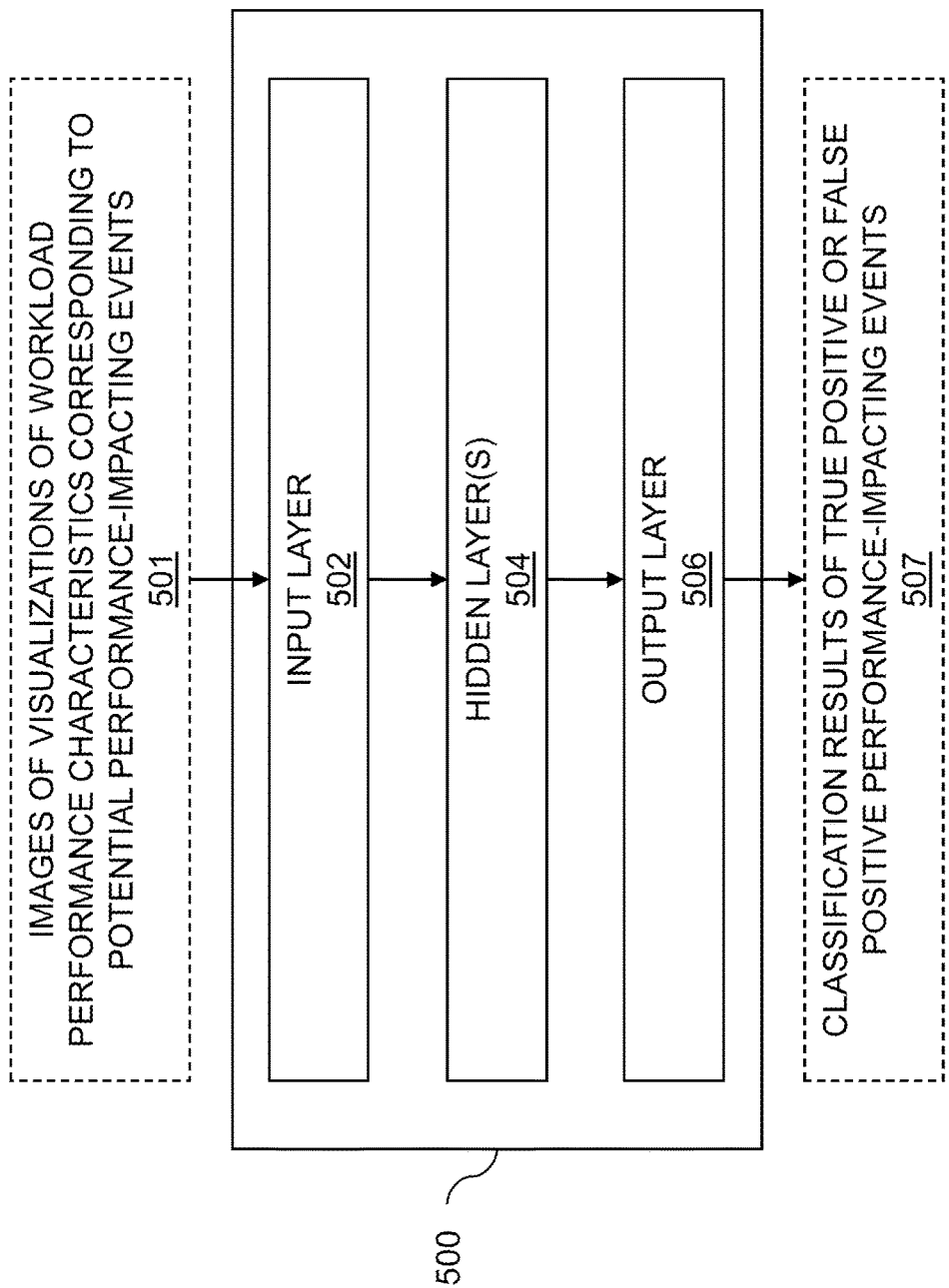
FIG. 5 shows an example architecture of a neural network for classifying potential performance-impacting events affecting workloads running on one or more storage systems in an illustrative embodiment.

FIG. 5 shows an example architecture 500 of an implementation of a neural network used to classify potential performance-impacting events as true positive or false positives. In the FIG. 5 example, the neural network architecture 500 provides a CNN, although other types of neural network architectures may be used including fully connected neural network architectures, Recurrent Neural Network (RNN) architectures, etc. As illustrated in FIG. 5, images 501 of visualizations of workload performance characteristics corresponding to potential performance-impacting events are provided to an input layer 502 of the neural network architecture 500. The images 501 may be similar to the plots 300 and 400 shown in FIGS. 3 and 4, though the images 501 are assumed to include plots or other visualizations of performance characteristics corresponding to potential performance-impacting events. As noted above, the potential performance-impacting events may be detected using algorithms that analyze monitored performance characteristics to identify certain designated patterns in the monitored performance characteristics. The input layer 502 takes the images 501 and provides them to the one or more hidden layers 504 for processing. Advantageously, when a CNN is used data preparation is not required for images 501, and the images 501 may be passed as-is to the input layer 502. If other types of neural network architectures are used, however, it may be required to perform some data preparation (e.g., some designated conversion of the images 501 to a format suitable for processing). The images 501 may comprise JPEG image files or other types of image files that are programmatically saved as output from one or more monitoring tools.

The neural network architecture 500 (e.g., a CNN architecture) may use multiple hidden layers (e.g., two hidden layers) with activation functions for detecting features in the images 501. In some embodiments, the activation functions of the hidden layers 504 are implemented using RELUs. An output layer 506 is coupled to the hidden layers 504 (e.g., to a last one of the hidden layers 504). The output layer 506, which may be implemented as a softmax output layer, utilizes features detected by the activation functions of the hidden layers 504 to identify interactions and linearities present in the images 501 to classify each of the images as corresponding to a true positive or false positive performance-impacting event. The output layer 506 provides such classification results 507 as output, which may be used to initiate various remedial action. Various hyperparameters may be used to configure the neural network architecture 500. In some embodiments, a batch size in the range of 16 to 128 is used, with 500 epochs and a learning rate of 0.5. It should be appreciated, however, that the values of these and other hyperparameters may vary as desired for a particular implementation. For example, the hyperparameters may be tuned based on available computing resources and time.

On classifying a potential performance-impacting event as a false positive, the remedial action may comprise generating and sending a notification or alert to an operator or other user associated with a workload or storage system indicating as such (e.g., augmenting the output of a monitoring tool, indicating that certain patterns in the performance data for a workload or storage system correspond to workload changes rather than performance-impacting events). On classifying a potential performance-impacting event as a true positive, the remedial action may comprise modifying the provisioning of storage resources that are allocated to the workload or storage system experiencing the performance-impacting event.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for classifying potential performance-impacting events affecting workloads running on one or more storage systems will now be described in greater detail with reference to FIGS. 6 and 7. Although described in the context of system 100, these platforms may also be used to implement at least portions of other information processing systems in other embodiments.

Figure 6:
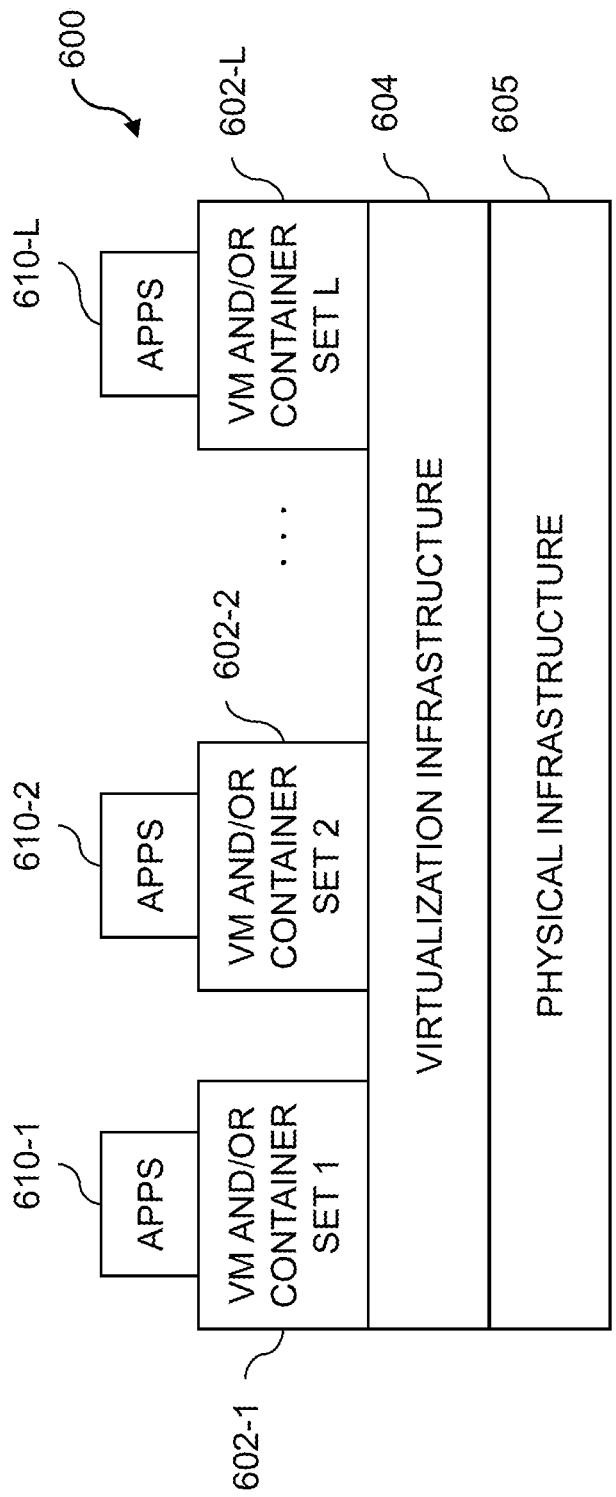
FIGS. 6 and 7 show examples of processing platforms that may be utilized to implement at least a portion of an information processing system in illustrative embodiments.
Figure 7:
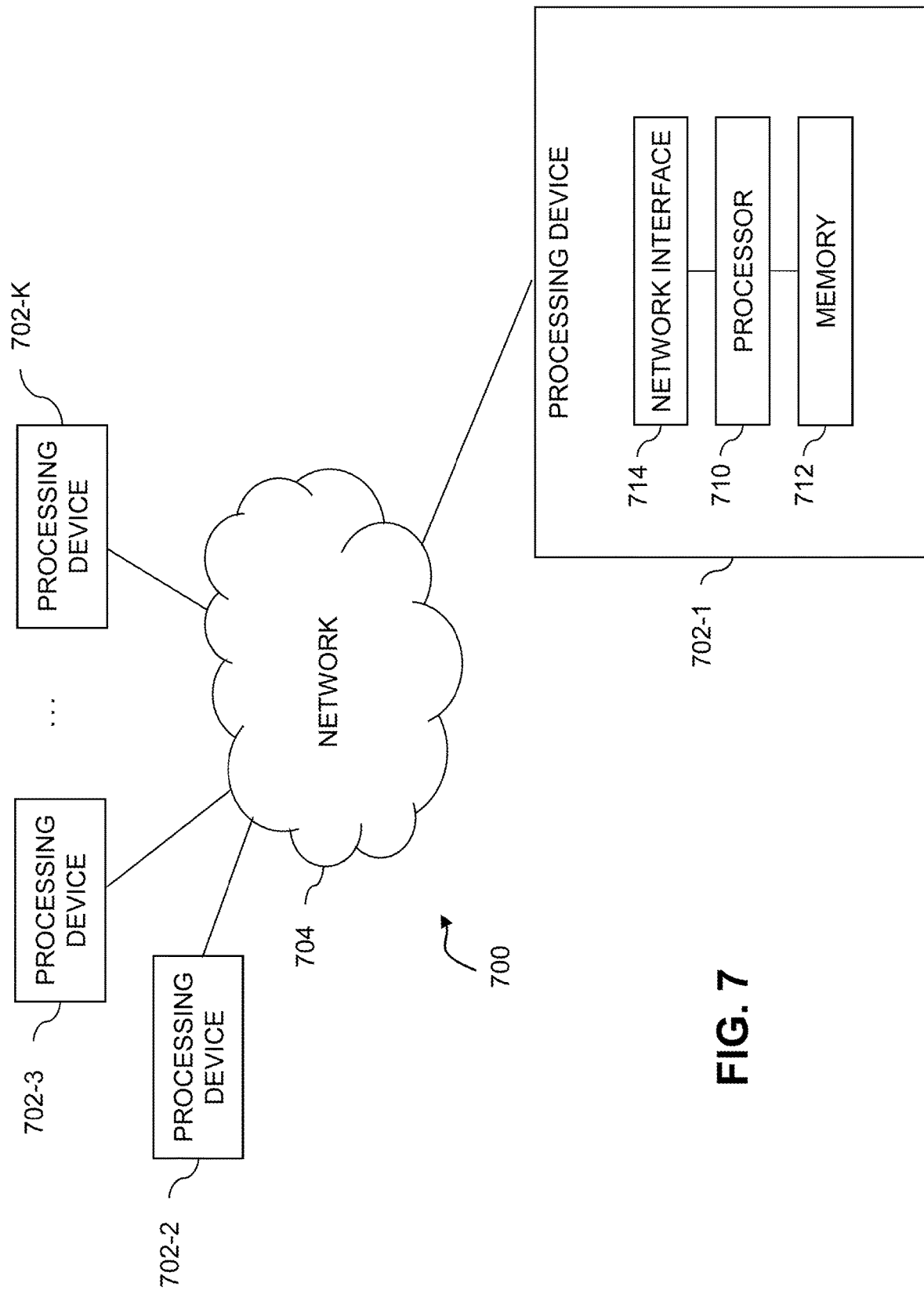

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise RAM, read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for classifying potential performance-impacting events affecting workloads running on one or more storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, machine learning algorithms, etc.

Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   monitoring a given workload running on one or more storage systems to obtain performance data associated with the given workload;
   detecting a given potential performance-impacting event affecting the given workload based at least in part on a given portion of the obtained performance data;
   generating a visualization of at least the given portion of the obtained performance data;
   providing the generated visualization as input to a machine learning algorithm;
   utilizing the machine learning algorithm to classify the given potential performance-impacting event as one of (i) a true positive event affecting performance of the given workload and (ii) a false positive event corresponding to one or more changes in storage resource utilization by the given workload; and
   modifying provisioning of storage resources of the one or more storage systems responsive to classifying the given potential performance-impacting event as a true positive event affecting performance of the given workload;
   wherein the method is performed by at least one processing device comprising a processor coupled to a memory.

2. The method of claim 1 wherein the performance data comprises a plurality of performance metrics for the given workload over a designated time range.

3. The method of claim 2 wherein the plurality of performance metrics comprise one or more throughput metrics, one or more latency metrics and one or more queue depth metrics.

4. The method of claim 3 wherein the one or more queue depth metrics are derived at least in part from the one or more throughput metrics and the one or more latency metrics.

5. The method of claim 2 wherein the plurality of performance metrics comprises a percentage of input-output (IO) requests of the given workload that are read requests.

6. The method of claim 2 wherein detecting a given potential performance-impacting event affecting the given workload comprises detecting at least one of:
   covariance between two or more of a plurality of performance metrics in a time series of the performance data;
   correlations between two or more of the plurality of performance metrics in the performance data; and
   violation of one or more designated threshold conditions associated with one or more of the plurality of performance metrics in the performance data.

7. The method of claim 1 wherein the machine learning algorithm comprises a neural network architecture.

8. The method of claim 7 wherein the neural network architecture comprises a Convolutional Neural Network (CNN).

9. The method of claim 8 wherein the CNN comprises:
   an input layer configured to receive as input an image file comprising the generated visualization;
   at least one hidden layer configured to detect features in the generated visualization corresponding to true positive performance impacting events affecting performance of the given workload and false positive events corresponding to one or more changes in storage resource utilization by the given workload; and
   an output layer configured to utilize the detected features to classify the given potential performance-impacting event as one of (i) a true positive event affecting performance of the given workload and (ii) a false positive event corresponding to one or more changes in storage resource utilization by the given workload.

10. The method of claim 9 wherein the at least one hidden layer utilizes one or more Rectified Linear Unit (RELU) activation functions.

11. The method of claim 9 wherein the output layer comprises a softmax output layer.

12. The method of claim 1 further comprising, responsive to classifying the given potential performance-impacting event as a false positive event corresponding to one or more changes in storage resource utilization by the given workload, generating and providing an alert to a user associated with the given workload indicating that a change in performance of the given workload is a result of the one or more changes in storage resource utilization by the given workload.

13. The method of claim 12 further comprising generating a recommendation for one or more changes to storage resources allocated to the given workload responsive to the one or more changes in storage resource utilization by the given workload.

14. The method of claim 1 wherein modifying provisioning of storage resources of the one or more storage systems comprises at least one of allocating additional storage resources to the given workload and migrating the given workload from a first set of storage resources to a second set of storage resources.

15. A computer program product comprising a non-transitory processor-readable storage medium having stored therein program code of one or more software programs, wherein the program code when executed by at least one processing device causes the at least one processing device:
   to monitor a given workload running on one or more storage systems to obtain performance data associated with the given workload;
   to detect a given potential performance-impacting event affecting the given workload based at least in part on a given portion of the obtained performance data;
   to generate a visualization of at least the given portion of the obtained performance data;
   to provide the generated visualization as input to a machine learning algorithm;
   to utilize the machine learning algorithm to classify the given potential performance-impacting event as one of (i) a true positive event affecting performance of the given workload and (ii) a false positive event corresponding to one or more changes in storage resource utilization by the given workload; and
   to modify provisioning of storage resources of the one or more storage systems responsive to classifying the given potential performance-impacting event as a true positive event affecting performance of the given workload.

16. The computer program product of claim 15 wherein the performance data comprises a plurality of performance metrics for the given workload over a designated time range, and wherein detecting a given potential performance-impacting event affecting the given workload comprises detecting at least one of:
  covariance between two or more of a plurality of performance metrics in a time series of the performance data;
  correlations between two or more of the plurality of performance metrics in the performance data; and
  violation of one or more designated threshold conditions associated with one or more of the plurality of performance metrics in the performance data.

17. The computer program product of claim 15 wherein the machine learning algorithm comprises a Convolutional Neural Network (CNN) architecture comprising:
  an input layer configured to receive as input an image file comprising the generated visualization;
  at least one hidden layer configured to detect features in the generated visualization corresponding to true positive performance impacting events affecting performance of the given workload and false positive events corresponding to one or more changes in storage resource utilization by the given workload; and
  an output layer configured to utilize the detected features to classify the given potential performance-impacting event as one of (i) a true positive event affecting performance of the given workload and (ii) a false positive event corresponding to one or more changes in storage resource utilization by the given workload.

18. An apparatus comprising:
  at least one processing device comprising a processor coupled to a memory;
  the at least one processing device being configured:
    to monitor a given workload running on one or more storage systems to obtain performance data associated with the given workload;
    to detect a given potential performance-impacting event affecting the given workload based at least in part on a given portion of the obtained performance data;
    to generate a visualization of at least the given portion of the obtained performance data;
    to provide the generated visualization as input to a machine learning algorithm;
    to utilize the machine learning algorithm to classify the given potential performance-impacting event as one of (i) a true positive event affecting performance of the given workload and (ii) a false positive event corresponding to one or more changes in storage resource utilization by the given workload; and
    to modify provisioning of storage resources of the one or more storage systems responsive to classifying the given potential performance-impacting event as a true positive event affecting performance of the given workload.

19. The apparatus of claim 18 wherein the performance data comprises a plurality of performance metrics for the given workload over a designated time range, and wherein detecting a given potential performance-impacting event affecting the given workload comprises detecting at least one of:
  covariance between two or more of a plurality of performance metrics in a time series of the performance data;
  correlations between two or more of the plurality of performance metrics in the performance data; and
  violation of one or more designated threshold conditions associated with one or more of the plurality of performance metrics in the performance data.

20. The apparatus of claim 18 wherein the machine learning algorithm comprises a Convolutional Neural Network (CNN) architecture comprising:
  an input layer configured to receive as input an image file comprising the generated visualization;
  at least one hidden layer configured to detect features in the generated visualization corresponding to true positive performance impacting events affecting performance of the given workload and false positive events corresponding to one or more changes in storage resource utilization by the given workload; and
  an output layer configured to utilize the detected features to classify the given potential performance-impacting event as one of (i) a true positive event affecting performance of the given workload and (ii) a false positive event corresponding to one or more changes in storage resource utilization by the given workload.

\* \* \* \* \*